Patented June 27, 1950

2,513,179

UNITED STATES PATENT OFFICE 2,513,179

ALCOHOL DERIVED FROM 1-VINYLCYCLOHEXENE-3

Herbert L. Johnson, Media, Pa., and Frances J. Bondhus, Oskaloosa, Iowa, assignors to Sun Oil Company, Philadelphia, Pa., a corporation of New Jersey No Drawing. Application January 16, 1946, Serial No. 641,643

2 Claims. (Cl. 260—617)

This invention relates to an alcohol derived from a vinylcyclohexene.

In abandoned application Serial No. 636,510, filed December 21, 1945, now continuation-in-part Serial No. 778,270, filed October 6, 1947, by the instant inventors, there are described and claimed esters of vinylcyclohexene. Specifically, in that application, there is described and claimed an acetic acid mono-ester of 1-vinylcyclohexene-3 which is a colorless liquid having a pleasant odor, a boiling range of 210° C.–211° C., at 765 mm. Hg, and a refractive index of 1.4556 $n_D^{25°C}$.

According to the invention a monohydric alcohol of vinylcyclohexene was prepared by refluxing 37 grams of the above characterized ester of vinylcyclohexene for 10 hours with 150 grams of 20% KOH. At the end of this period the odor of the ester had disappeared. The reaction mixture was cooled to room temperature, transferred to a separatory funnel and the alcohol separated from the aqueous layer. The extract was dried with calcium sulfate.

The sulfate was removed and the products distilled in vacuo. The product had a boiling point of 60° C. at 4 mm. Hg pressure, was a colorless liquid and had a refractive index of 1.4807 $n_D^{20°C}$.

This product appears to be useful as a solvent and as a chemical intermediate for the preparation of other products.

In the above identified application it set forth that vinylcyclohexene can exist in three forms, namely 1-vinylcyclohexene-3; 1-vinylcyclohexene-2; and 1-vinylcyclohexene-1. The alcohol prepared according to this invention was that obtained upon treatment of the acetic acid ester of 1-vinylcyclohexene-3, as described above.

We claim:

1. The process of preparing a monohydric alcohol product of 1-vinylcyclohexene-3 which comprises treating 1-vinylcyclohexene-3 with acetic acid under esterifying conditions, separating acetic acid mono-ester from the reaction mixture, heating said acetic acid mono-ester with an aqueous alkaline solution, and separating monohydric alcohol product obtained from the reaction mixture.

2. The process according to claim 1 wherein the aqueous alkaline solution is an aqueous solution of potassium hydroxide.

HERBERT L. JOHNSON.
FRANCES J. BONDHUS.

REFERENCES CITED

The following references are of record in the file of this patent:

UNITED STATES PATENTS

| Number | Name | Date |
|---|---|---|
| 2,317,949 | Burk | Apr. 27, 1943 |
| 2,415,000 | Bearse et al. | Jan. 28, 1947 |

OTHER REFERENCES

Dimroth: Berichte, 71B, 1333–45 (1938).
Beilstein, vol. VI, Supplement, page 36.
Beilstein, vol. VI, page 50.